3,647,743
GLASS FIBRE REINFORCED POLYACETAL
RESIN COMPOSITION
Kazuo Nagamatsu, Tokyo, Masatsugu Yoshino and Tsugio Konno, Irumagun, and Shinichi Ishida, Tokyo, Japan, assignors to Asahi Kasei Kogyo Kabushiki Kaisha, Osaka, Osaka Prefecture, Japan
No Drawing. Filed Dec. 17, 1969, Ser. No. 885,987
Claims priority, application Japan, Dec. 24, 1968, 43/94,170
Int. Cl. C08g 51/10
U.S. Cl. 260—37 AL                 6 Claims

ABSTRACT OF THE DISCLOSURE

This invention discloses a glass fibre reinforced polyacetal resin composition comprising 5 to 65% by weight, based on the weight of the composition, of glass fibres coated with styrene-type polymer, and a polyacetal resin. The glass fibre reinforced polyacetal resin composition of this invention is produced by mixing glass fibres with a polyacetal resin after a styrene-type resin is coated on and adhered to the surface of the glass fibres. Thus, not only the impact strength but also other properties such as heat distortion temperature, mold shrinkage, hue and heat resistance can be greatly improved. Moreover, not so much gas is evolved on melting and heating the glass fibre reinforced polyacetal resin of this invention, as compared with conventional ones.

---

This invention relates to a glass fibre reinforced polyacetal resin composition and more particularly to a glass fibre reinforced polyacetal resin composition produced by coating the surface of glass fibres with a styrene-type resin and then mixing the resulting glass fibres with a polyacetal resin.

Heretofore, a method of mixing glass fibres with a resin to improve practical properties of the resin such as mechanical and thermal properties has been tried on most of thermoplastic resins as well as thermosetting ones, and well known to be able to give the resins excellent properties; many patents have been presented as to such compositions and methods for the manufacture thereof, and also commercial products are used now. When examining the reinforcement by glass fibres precisely, however, the behavior greatly varies depending on the sort of the resin used. Especially, a polyacetal resin belongs to a class of resins of which the impact resistance is not improved but rather decreased by mixing with glass fibres, as shown in Japanese patent publication No. 20,831/66 and Belgian Pat. No. 678,859.

We have made an intensive investigation to obtain the polyacetal resin well reinforced with glass fibres, particularly to improve its impact resistance. As a result, we have found out that the purpose can be achieved by coating the surface of glass fibres with a styrene-type resin and then mixing them with a polyacetal resin.

As compared with the polyacetal resin composition obtained by merely mixing a polyacetal resin with glass fibres, the glass fibre reinforced polyacetal resin composition of the present invention brings about favourable results in the heat distortion temperature, mold shrinkage, hue and heat resistance as well as in the impact resistance. It can also improve greatly the functional capacity of the polyacetal resin.

The essential point of this invention consists in substantially coating and adhering the surface of glass fibres with a sytrene-type resin and bonding the glass fibres and a polyacetal resin not directly but via the styrene-type resin present between them.

According to the present invention, the impact resistance which is ordinarily reduced by mixing glass fibres with a polyacetal resin can be rather improved, and in spite of incorporating a styrene-type resin having a low heat distortion temperature, a high heat distortion temperature can be retained. Moreover, when more than 10% by weight, based on the weight of the glass fibres, of a polystyrene resin is used, the produced resin composition becomes much colorless to be suitable for the applications wherein the appearance of the product is an important factor. The glass fibre reinforced polyacetal resin composition of the present invention possesses a very low mold shrinkage; even when mixed with a large amount of glass fibres, the moldability is little deteriorated, and thus it is very preferable as engineering plastics. Such effects cannot be expected from the properties of each of the conventional glass fibre reinforced polyacetal resin composition and the styrene-type resin, but are novel findings that have not been known. Further, the glass fibre reinforced polyacetal resin composition of this invention has more preferable characteristics that not so much gas is evolved by thermal decomposition on melting and heating: for example, when a mixture consisting of 80% by weight of polyoxymethylene and 20% by weight of glass fibres and a composition of the present invention consisting of 75% by weight of polyoxymethylene, 25% by weight of glass fibres coated with polystyrene (glass fibres:polystyrene=20:5) were allowed to stand in the air at 220° C. for 70 minutes, the loss in weight of the former was 2.89% by weight, while that of the latter was only 1.41%.

For manufacturing the glass fibre reinforced polyacetal resin composition of the present invention, it is insufficient to merely mix glass fibres, a polyacetal resin and a styrene-type resin but it is necessary first to coat the surface of the glass fibres with the styrene-type resin and then mixing the resulting glass fibres with the polyacetal resin. As to coating the surface of the glass fibres with the styrene-type resin, any coating method may be employed as long as the styrene-type resin can substantially adhere closely to the surface of the glass fibres; for instance, a method wherein a styrene-type resin is dissolved in a solvent such as benzene and then glass fibres are immersed in the solution and then dried, a method wherein glass fibres are passed through a molten state styrene-type resin, and a method wherein glass fibres are passed through styrene monomer or a solution prepared by dissolving in styrene monomer the polymer and then heated to perform the polymerization of the styrene monomer on the surface of them are effective.

The effect of the present invention varies depending on the amount of the mixed glass fibres or the styrene-type resin, but surprisingly, it is effective even when the amount of the styrene-type resin is either as small as $10^{-3}$% by weight, based on the weight of the glass fibres or as large as 150% by weight. More preferably, the styrene-type resin is employed in an amount of $10^{-1}$ to 100% by weight, based on the weight of glass fibres. This can not be expected at all by the ordinary philosophy, but it should be considered to be caused by the special behavior of the styrene-type resin present between the glass fibre and polyocetal resin.

The term "polyacetal resin" in the present invention is intended to mainly include polyoxymethylene homopolymer, and its copolymers containing more than 80% by weight of oxymethylene units in its molecule, and the "styrene-type resin" indicates homopolystyrene and its copolymers. Representative comonomers are acrylonitrile, butadiene, α-methyl styrene, methacrylate, dimethyl styrene, etc. and examples of the copolystyrenes are acrylonitrile-butadiene-styrene copolymer, acrylonitrile-styrene copolymer, high-impact polystyrene resin, and mixtures of the above resins with other resins.

As glass fibres to be used in the present invention, either untreated ones or commercially available ones which are generally aminosilane compound-treated, epoxysilane compound-treated or "Volan" (trade name by E. I. du Pont) treated may be used. In this invention, as a polyacetal resin is bonded with glass fibres not directly but via the styrene-type resin, whether glass fibres are treated or untreated has no so appreciable influence on the effect of the present invention.

The amount of the glass fibres coated with a styrene-type resin employed in this invention is suitably 5 to 65% by weight, and particularly preferably 10 to 50% by weight, based on the weight of the composition. The glass fibre may be in any shape, either of long fibre or of short fibre, as long as a styrene-type resin can be coated on and adhered closely to the surface of the glass fibre. For instance, when a small content of the styrene-type resin is intended, it is recommended to employ a method of passing the long glass fibres through a dilute solution of the styrene-type resin or a method of applying a small amount of styrene monomer onto the surface of the glass fibres, followed by polymerization: when a large content of the styrene-type resin is desired, there may be employed a method to pass the fibres through a concentrated solution of the styrene-type resin, a method to apply a viscous solution prepared by dissolving in styrene monomer the polymer and then perform the polymerization of styrene monomer, a method to mix further the glass fibres having a small amount of the above solution added thereto with a styrene-type resin, or a method to mix the glass fibre directly with the styrene-type resin. As to a length of the fibre in a final product, glass fibres of $40\mu$–$600\mu$ long yield good result in case they have a diameter of $8\mu$. The fibres shorter than $40\mu$ show a lowering in impact resistance; the ones longer than $600\mu$ tend to cause uneven mixing and consequently to deteriorate the appearance of a product and, at the same time, they cause the decrease in the runnability or fluidability to render the molding of the material impossible or cause some molding defects.

In order to clarify the effects of the present invention, the more concrete explanation will be made hereinbelow on the mixing method, the composition ratio and other details.

Firstly, the mixing method is elucidated: after mixing, for example, 70% by weight of a polyoxymethylene resin, 20% by weight of glass fibres, and 10% by weight of polystyrene with a blender, a specimen was prepared using an injection molding machine at a cylinder temperature of 200° C. and a metal mold temperature of 80° C., while another specimen was prepared in the same manner as described above, except that 30% by weight of glass fibres previously coated with polystyrene (glass fibres:polystyrene=20:10), is mixed with 70% by weight of polyoxymethylene resin using a blender. These specimens were tested in accordance with the impact strength (IZOD) test (ASTM D256–56) and the heat distortion temperature test (ASTM D648–56). The results are shown in Table 1, from which the effects of the present invention are clear.

TABLE 1

|  | Resin obtained by merely mixing the components | Resin composition of this invention |
|---|---|---|
| Impact strength (Izod) 20° C., 65% RH, (kg.·cm./cm.) | 1.2 | 6.4 |
| Heat distortion temperature, 264 p.s.i., (° C.) | 123 | 158 |

In the glass fibre reinforced polyacetal resin which is now commercially available, there is incorporated, for example, aminosilane compound-treated glass fibres or epoxysilane compound-treated ones, but its impact strength (IZOD) is about 4 kg.·cm./cm., while its heat distortion temperature (264 p.s.i.) is about 150 to 160° C. In the present invention, by coating the surface of glass fibres with a cheap polystyrene resin, as different from the conventional process, there can be obtained some properties that cannot be gained by the conventional one, such as increase of impact strength, reduction of mold shrinkage, and improvement of the hue of moldings.

Secondly, the influence when varying the quantity of polystyrene is explained. The glass fibres were employed constantly in an amount of 28% by weight. For coating the glass fibres with polystyrene, the glass fibres were immersed in a polystyrene solution in benzene and then dried. For varying the coating amount of polystyrene, there may be such methods as varying the concentration of the solution or repeating immersing and drying several times, but there may most conveniently be employed a method wherein a necessary amount of polystyrene chips is added when mixing the glass fibres thin coated by a solution method and polyacetal. In the instant experiment, the quantity of polystyrene was adjusted by varying the concentration of the solution, and after mixing with polyoxymethylene, the composition thus obtained was molded using an injection molding machine at a cylinder temperature of 203° C. and a metal mold temperature of 75° C. to prepare specimens. The properties of these specimens were then determined, and the results are shown in Table 2.

TABLE 2

| Weight percent | | | Impact strength (Izod) (kg.-cm./cm.) | Heat distortion temperature (° C.) |
|---|---|---|---|---|
| Polystyrene | Polyoxymethylene | Glass fibres | | |
| *0.1 | 71.9 | 28 | 6.3 | 163 |
| *4.8 | 67.2 | 28 | 7.7 | 159 |
| *11 | 61 | 28 | 9.1 | 161 |
| *18 | 54 | 28 | 11.4 | 158 |
| *30 | 42 | 28 | 9.7 | 142 |
| *37.0 | 35.0 | 28 | 7.4 | 135 |
| 49.8 | 22.2 | 28 | 6.5 | 125 |

NOTE.—The asterisks indicate compositions of the present invention.

In Table 2, the specimens containing polystyrene more than 11% were free from yellowish color, and the ones containing more than 4.8% polystyrene had a mold shrinkage reduced to less than 0.4%; thus, the properties were remarkably improved, as compared with those of conventional glass fibres reinforced polyacetal resin. The impact strength (IZOD) in each specimen was higher than the ordinary one, and particularly it was so high with the specimens having a polystyrene content of 11 to 30% by weight.

Properties of the present composition are, of course, changed also depending on variation of the quantity of the glass fibres. Table 3 shows the results obtained by varying the amount of glass fibres from 1 to 50% by weight while maintaining a polystyrene amount at 15% by weight.

TABLE 3

| Weight percent | | | Impact strength (Izod) (kg.-cm/cm.) | Heat distortion temperature (° C.) |
|---|---|---|---|---|
| Glass fibres | Polyoxymethylene | Polystyrene | | |
| *1.1 | 83.9 | 15 | 3.2 | 105 |
| *5.6 | 79.4 | 15 | 4.7 | 115 |
| *10.0 | 75.0 | 15 | 5.1 | 141 |
| *19.7 | 65.3 | 15 | 7.3 | 159 |
| *28.1 | 56.9 | 15 | 10.8 | 163 |
| *41.8 | 43.2 | 15 | 9.5 | 163 |
| *52.3 | 32.7 | 15 | (1) | (1) |

[1] Yielding some molding defects.

NOTE.—The asterisks indicate compositions of the present invention.

As is apparent from the above results, the use of a glass fibre amount of more than 5% and less than 65% brings about a good result while with a glass fibres amount of less than 5%, improvement of impact strength, one of the characteristics of this invention, cannot be obtained and the heat distortion temperature is also unsatisfactory for practical use.

The invention is illustrated by the following examples. In the examples, all parts are given by weight, unless otherwise specified.

EXAMPLE 1

10 parts of polystyrene which had an intrinsic viscosity $(\eta)=0.90$ as determined at 25° C. in a solvent of benzene were dissolved in 30 parts of benzene. Glass strands each having a diameter of $10\mu$ were passed through the solution to coat the surface of the glass fibres with polystyrene. The amount of the adherent polystyrene after drying was 3.2 parts per 10 parts of the glass fibres. 100 grams of the resulting polystyrene coated glass fibres and 180 grams of polyoxymethylene having a melt index MI=10.5 (measured at 190° C. under a load of 2160 g. according to ASTM D-1238-57T) were mixed in a nitrogen atmosphere for 3 minutes, using a blender heater at 200° C. and then, the resulting composition was molded using an injection molding machine, at a cylinder temperature of 205° C. and a metal mold temperature of 75° C. into a specimen of 127 mm. long, 1.27 mm. wide and 3 mm. thick.

The average length of the glass fibres in the specimen was about 0.32 mm., and the specimen showed an impact strength (IZOD) of 8.9 kg.·cm./cm. and a heat distortion temperature of 157° C. (under a load of 264 p.s.i.). The color of the molded article was greatly whiter than that of the simple polyoxymethylene resin, and it is a preferable tendency. The mold shrinkage calculated from the dimensions of the metal mold and the molded article was 0.28%, which is also an extremely preferable value in practical use.

Example 2

The following experiment was carried out using the same polymer and glass fibres as used in Example 1. A 5% polystyrene solution in benzene was prepared; the glass fibres were passed through the solution and then dried to make the polystyrene coated glass fibres in which 2 parts of polystyrene adhered to per 100 parts of the glass fibres. 30 parts of the said polystyrene coated glass fibres and 70 parts of polyoxymethylene were mixed and molded in the same manner as described in Example 1. The average length of the glass fibres in the specimen was 0.29 mm. The specimen showed an impact strength (IZOD) of 7.6 kg.·cm./cm. and a heat distortion temperature of 161° C. (under a load of 264 p.s.i.). The mold shrinkage was 0.34%, and the weight loss due to thermal decomposition when leaving the specimen in the air at 220° C. for 70 minutes was 1.63% which was remarkably low, as compared with 2.95% of the specimen containing no polystyrene.

Example 3

30 parts of polystyrene were dissolved in 100 parts of styrene monomer; after adding thereto 1% by weight of lauroyl peroxide as a radical polymerization initiator, the solution was allowed to adhere onto the surface of the glass fibres and polymerize at 65° C. for 2 hours: thus, there was obtained polystyrene coated glass fibres in which the adherent polystyrene was 13.4% by weight, based on the weight of glass fibres. 35 grams of the resulting fibres were mixed with 100 grams of polyoxymethylene and molded in the same manner as described in Example 1. The average length of the glass fibres in the molding was about 0.37 mm. The molded article showed an impact strength (IZOD) of 12.8 kg.·cm./cm. and a heat distortion temperature of 156° C. (under a load of 264 p.s.i.).

Example 4

10 parts of polystyrene having an intrinsic viscosity $(\eta)=0.8$ as measured at 25° C. in a solvent of benzene were dissolved in 30 parts of benzene, and the glass strands each having a diameter of $10\mu$ were passed through the solution to coat the surface of the glass fibres with polystyrene. The amount of adherent polystyrene after drying was 3.0 parts per 10 parts of the glass strands. After cutting the said polystyrene coated glass fibres into the pieces of 10 mm. long, 10 kg. of the said glass fibres and 18 kg. of copolyoxymethylene containing 1.5% by weight of dioxolan components in its molecule (prepared from trioxane and dioxolan) and having a melt index MI=9.0 were mixed and pelletized by means of a screw provided with Dulmage system at a cylinder temperature of 195° C.

Then, a specimen of 127 mm. long, 12.7 mm. wide, and 3 mm. thick was molded under such molding conditions as a cylinder temperature of 200° C. and a mold temperature of 80° C. The impact strength (IZOD) of the said specimen was 7.1 kg.·cm./cm., and the heat distortion temperature thereof (under a load of 264 p.s.i.) was 163° C. while that of a specimen prepared from the same copolyoxymethylene alone was 110° C. The whiteness of the specimen was remarkably superior to that of the same copolyoxymethylene alone, and it is a very preferable tendency. The mold shrinkage of the molded article was 0.25%, and it is also a very preferable value in practice.

Example 5

In the latex (solid content=50%) of styrene-butadiene copolymer (composition ratio=43:57), aminosilane compound-treated glass fibres having a diameter of $13\mu$ and an average length of 5 mm. were immersed and dried. The amount of the styrene-butadiene copolymer adhered to the glass fibres was 1.5% by weight. 20 grams of said styrene-butadiene copolymer coated glass fibres and 80 grams of the same polyoxymethylene as used in Example 1 were mixed and molded in the same manner as described in Example 1. The impact strength (IZOD) of the molded article was 7.7 kg.·cm./cm. and its heat distortion temperature was 160° C. On leaving the specimen in the air at 222° C. for 70 minutes, the weight loss due to thermal decomposition was evaluated as 1.0%, which was much lower than that (2.95%) of a molded article prepared without styrene-butadiene copolymer.

Example 6

500 parts of acrylonitrile-styrene copolymer (composition ratio=25:75, viscosity as measured in a 10% solution in methylethylketone at room temperature=10 centipoises) and 500 parts of glass fibres having a diameter of $15\mu$ and an average length of 5 mm. were well mixed in the Banbury mixer at 240° C. The resulting mixture was shaped into a sheet of 2 mm. thick and then pelletized.

50 parts of the pellets thus obtained were mixed with 100 parts of polyoxymethylene having a melt index MI=3.0 and the resulting composition was extruded at a cylinder temperature of 200° C. to produce polyacetal pellets. A specimen was molded from the pellets in the same manner as described in Example 1; its impact strength (IZOD) was 11.0 kg.·cm./cm. and the heat distortion temperature was 157° C.

EXAMPLE 7

500 parts of methyl methacrylate-styrene copolymer (composition ratio=20:80, intrinsic viscosity $(\eta)$ as measured in a dimethylformamide solution at 80° C.=0.8) and 500 parts of glass fibres of $10\mu$ in the diameter and 6 mm. in the average length were well mixed in a Banbury mixer at 240° C. The resulting mixture was shaped into a sheet of 2 mm. thick and then pelletized.

60 parts of the pellets were mixed with 100 parts of copolyoxymethylene having a melt index MI=20.0 and containing 2% by weight of butanediolformal in its molecule (prepared from formaldehyde and butanediol) extruded at a cylinder temperature of 200° C. and pelletized.

The pellets were molded by means of an injection molding machine of the inline screw type having a diameter of 20 m./m. at a cylinder temperature of 200° C.

and a mold temperature of 85° C. Thus, the specimen having the same size as in Example 1 was prepared.

The heat distortion temperature of said specimen was 158° C., while that of the copolyoxymethylene containing no methyl methacrylate-styrene copolymer was only 109° C. The remarkable improvements in a whiteness and surface gloss were observed in said specimen.

What is claimed is:

1. A glass fibre reinforced polyacetal composition comprising 5 to 65% by weight of glass fibres, based on the weight of the composition, and a polyacetal resin selected from the group consisting of polyoxymethylene homopolymer and copolymers of oxymethylene containing more than 80% by weight of oxymethylene units in the molecule, said glass fibres being coated with homopolystyrene or styrene copolymer, whereby said homopolystyrene or styrene copolymer separates the glass fibres from the polyacetal resin.

2. A glass fibre reinforced polyacetal resin composition as claimed in claim 1, wherein the amount of glass fibres coated with said homopolystyrene or styrene copolymer is 10 to 50% by weight, based on the weight of the composition.

3. A glass fibre reinforced polyacetal resin composition as claimed in claim 1, wherein the amount of said homopolystyrene or styrene copolymer in the composition is $10^{-3}$ to 150% by weight, based on the weight of the glass fibres.

4. A glass fibre reinforced polyacetal resin composition as claimed in claim 1, wherein the amount of said homopolystyrene or styrene copolymer in the composition is $10^{-1}$ to 100% by weight, based on the weight of the glass fibres.

5. A method for producing a glass fibre reinforced polyacetal resin composition which comprises coating the surface of glass fibres with homopolystyrene or styrene copolymer and then mixing the coated glass fibres with a polyacetal resin selected from the group consisting of polyoxymethylene homopolymer and copolymers of oxymethylene containing more than 80% by weight of oxymethylene units in the molecule, the amount of said glass fibre coated with said homopolystyrene or styrene copolymer being 5 to 65% by weight based on the weight of the composition.

6. A method as claimed in claim 5, wherein said homopolystyrene or styrene copolymer is employed in an amount of $10^{-3}$ to 150% by weight, based on the weight of the glass fibres.

References Cited

UNITED STATES PATENTS

| 3,450,665 | 6/1969 | Wagner et al. | 260—37 |
| 3,455,867 | 7/1969 | Berardinelli et al. | 260—37 |
| 3,471,439 | 10/1969 | Bixler et al. | 260—37 X |
| 3,519,593 | 7/1970 | Bolger | 260—41 A |

LEWIS T. JACOBS, Primary Examiner

U.S. Cl. X.R.

260—41 AG, 874